May 25, 1954 J. ROBINSON 2,679,234
MOTOR DISTRIBUTING VALVE WITH A LOAD FEEL AREA
Filed June 28, 1952
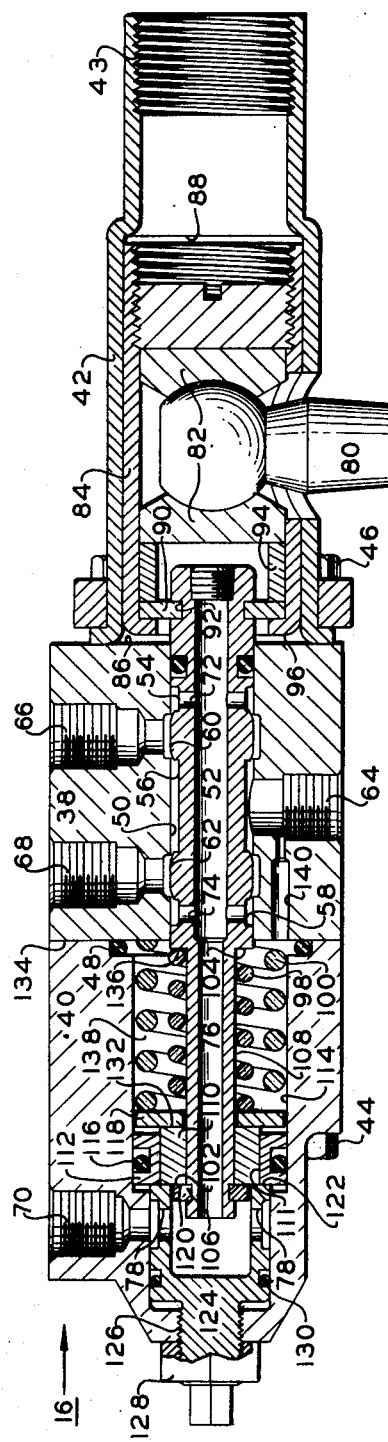
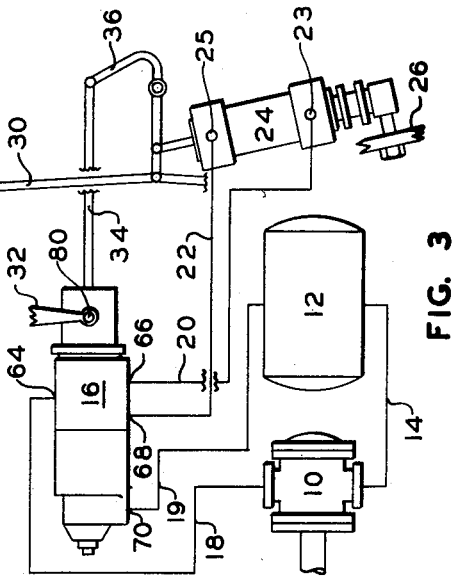
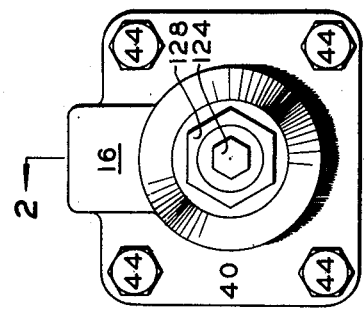
INVENTOR.
JAMES ROBINSON
BY
ATTORNEY Patented May 25, 1954

2,679,234

UNITED STATES PATENT OFFICE 2,679,234

MOTOR DISTRIBUTING VALVE WITH A LOAD FEEL AREA

James Robinson, Huntington Woods, Mich., assignor to Vickers Incorporated, Detroit, Mich., a corporation of Michigan Application June 28, 1952, Serial No. 296,216

11 Claims. (Cl. 121—41)

This invention relates to power transmissions, and is particularly applicable to those of the type comprising two or more fluid pressure energy translating devices, one of which may function as a pump and another as a fluid motor.

The invention more particularly relates to power transmissions adapted for use in servo applications such as power steering the dirigible wheels of a vehicle.

Most designers of power steering systems for use in motor vehicles have endeavored to retain as nearly as possible the same handling characteristics as in the conventional manual system. This requires a follow-up type of system having "feel." By follow-up it is meant that the controlled member follows whatever movement is imparted to the controlling member, and "feel" means that the manual effort applied by the drive to the controlling member determines the force applied to the controlled member.

The type of control valve which has found the widest use in such systems has been the type having a neutral central position and being shiftable therefrom in opposite directions to effect opposite movement of a fluid motor connected to the vehicle dirigible wheels. Such valves are usually provided with spring-centering means to restore the valve to neutral position on removal of the shifting force. When "feel" is to be provided, one method is to add to the restoring force of the centering springs a hydraulically produced force also tending to restore, or center, the valve which is of a magnitude proportional to the force applied to the dirigible wheels. It is important in such valves that the centering means act to restore the valve to precisely the effective neutral position; otherwise improper steering will result. If the centered position of the valve is not made adjustable, machining tolerances must be very closely controlled, thus making the valve expensive to manufacture. Provisions made in the past for such adjustments have, however, been complex and difficult to manipulate requiring a number of operations.

It is an object of the present invention to provide an improved low cost control valve particularly well suited for use in a power steering system.

It is a further object to provide a spring-centered control valve, the center position of which is adjustable by a single simple adjustment.

It is also an object of the present invention to provide in a control valve having a neutral central position a novel hydraulic centering device to apply a restoring force to the valve when shifted from that central position.

Another object is to provide a control valve having coincident spring and hydraulic centered positions conjointly adjustable by the same simple adjustment.

Further objects and advantages of the present invention will be apparent from the following description, reference being had to the accompanying drawing wherein a preferred form of the present invention is clearly shown.

In the drawing:

Figure 1 is an end elevation of a control valve embodying a preferred form of the present invention.

Figure 2 is a section taken on line 2—2 of Figure 1.

Figure 3 is a schematic drawing illustrating the present invention utilized in a typical vehicle steering application.

Referring first to Figure 3 there is shown a pump 10 connected to a tank 12 by an inlet conduit 14 and to a control valve 16, embodying the present invention, by a delivery conduit 18. Control valve 16 is connected to the tank 12 by a return conduit 19. A pair of motor conduits 20 and 22 connect the control valve to opposing ends of a double-acting fluid motor 24 secured to the motor vehicle frame at 26. Motor 24 is connected to the tie rod 30 through part of a bell crank 36 to exert hydraulically produced steering force on the vehicle dirigible wheel 28. Pitman arm 32 acts on valve 16 to apply mechanical steering force to the wheel 28 through the valve 16, drag link 34, bell crank 36, and tie rod 30, and to control the application of hydraulically produced steering force as hereinafter described.

Referring now to Figures 1 and 2 the construction of the control valve 16 is there illustrated. The valve comprises a body 38 having an end cap 40 and a sleeve 42 secured thereto by bolts 44 and nuts 46. Sleeve 42 is threaded at 43 to provide for connection of drag link 34. An O ring seal 48 insures a fluid tight juncture of the end cap 40 and the body 38. Body 38 has a valve bore 50 therein which is provided with a slidable valve spool 52 having three cannelures 54, 56, and 58 thereon, thus forming a pair of lands 60 and 62. Body 38 is provided with a central pressure port 64 and a pair of motor ports 66 and 68. End cap 40 has a return port 70 therein.

In the central position of spool 52, as illustrated, an open-center condition exists, that is, pressure port 64 is in fluid communication with the return port 70 across lands 60 and 62, which have suitably tapered edges for that purpose, through radial passages 72 and 74, the central axial passage 76, and radial passages 78. It is also apparent that motor ports 66 and 68 both are connected to return port 70 when valve 52 is in the center position as shown. Movement of valve 52 will produce a pressure increase in one of the motor ports 66 or 68, in a manner well known in the art, thus producing hydraulic steering force at the motor 24.

Pitman arm 32 is provided with a ball stud 80 which is clamped between a pair of ball seats 82 carried by a sleeve 84. Sleeve 84 is axially slidable in sleeve 42, which is secured to the body 38 as aforesaid, to an extent determined by its endwise abutment with the body face 86 or the shoulder 88. Relative axial motion between spool 52 and sleeve 84 is prevented by a C washer 90 which engages a groove 92 in the spool 52, and is clamped between a spacer 94 and the inwardly flanged end 96 of sleeve 84.

Valve spool 52 is spring centered in bore 50 by a nested pair of springs 98 and 100 which, though of different diameters, preferably have the same rate and assembled load so that resistance to movement by spool 52 is the same in either direction. Spool 52 has a pair of spaced apart abutments 102 and 104 thereon which are provided by, for example, a C washer 106 and the shoulder formed at the juncture of the full diameter of spool 52 and a necked down extension 108. An axially floatable piston 110, positioned between abutments 102 and 104, encircles the necked down spool extension 108 in slidable fluid sealing engagement therewith, and is itself encircled in like manner by a cylindrical bore 111 in a sleeve 112. Sleeve 112 is slidably inserted in a bore 114 in the end cap 40 and is provided with an O ring seal 116 to prevent leakage therebetween. A washer 118 also encircles the extension 108 and for practical purposes may be regarded as a radial extension of piston 110. Spring 100 acting against body 38 biases the face 120 of piston 110 axially into abutment with the face 122 of a stop 124. Stop 124 is axially adjustable relative to the valve body 38 by means of threads 126 and is provided with a lock nut 128. An O ring seal 130 insures against leakage around the stop 124. Spring 98 acting between the piston 110 and the abutment 104 on spool 52 biases the abutment 102 into engagement with face 120 of the piston. Springs 98 and 100 thus bias spool 52 to a position fixed relative to stop 124 which stop, as aforesaid, is axially adjustable relative to the valve body 38.

It can be seen that the assembled load of the spring 98 must be overcome to shift spool 52 to the left relative to the body 38, and that of spring 100 must be overcome to shift the spool to the right. Springs 98 and 100 thus form a resilient coupling between relatively movable members which may be termed input and output members. The input member comprises valve spool 52 and those parts positively translatable therewith, including abutments 102 and 104, C washer 90, and the sleeve 84. The output member comprises body 38 and those parts positively translatable therewith, including end cap 40, sleeve 42, and stop 124. The normal spring centered position of spool 52 relative to the body 38 is thus easily adjustable by simply varying the axial location of the stop 124 in the end cap 40.

Bore 114, sleeve 112, the annular pressure effective area 132 on piston 110, the end wall 134 of body 38 and the annular pressure effective area 136 on spool 52 formed by abutment 104 co- operate to define a reaction pressure chamber 138. Chamber 138 is connected to the pressure port 64 by a fluid passage 140 in the body 38. Pressure in chamber 138 acts on pressure effective area 132 to bias the face 120 of piston 110 axially into abutment with the face 122 of stop 124 and acts on pressure effective area 136 to bias the abutment 102 into engagement with face 120 of the piston. Thus the position to which springs 98 and 100 bias spool 52 and the position to which pressure in chamber 138 biases spool 52 are coincident and conjointly adjustable by the adjustment of stop 124.

Since the pressure in port 64, and consequently that in chamber 138, varies directly with the amount of hydraulically produced steering force being applied to the dirigible wheel 28, pressure in chamber 138 acts to create a force proportional to the hydraulically produced steering force to aid springs 98 and 100 in resisting movement of spool 52 thereby providing control with "feel." For example, if spool 52 is shifted to the left, spring 98 must be overcome, and pressure in chamber 138, which is proportional to the hydraulically produced steering force, will act on the annular pressure effective area 136 producing a force on the spool 52 aiding spring 98. If spool 52 is shifted to the right, spring 100 must be overcome and pressure in chamber 138 will act on the large annular area 132 of the piston 110, as well as the area 136, producing a net force on spool 52 aiding spring 100.

The areas 132 and 136 may be in a ratio of 2:1, in which case any given pressure in chamber 138 will exert equal centering force on spool 52 in either direction. However, to provide proper "feel" in both directions, the ratio of the difference between areas 132 and 136 to area 136 should equal the ratio of the effective area of motor 24 exposed to pressure in port 23 to the effective area of motor 24 exposed to pressure in port 25. Thus any given pressure in chamber 138 will exert a centering force on spool 52 dependent on the steering force that pressure is producing at the motor 24.

In operation, the vehicle operator may apply apply a steering movement to the pitman arm 32 and ball stud 80 through a conventional steering wheel and gear. The resistance encountered by the dirigible wheels 28 determines the action of valve 16. If that resistance is slight valve 16 may act as merely a mechanical link in the steering mechanism. For example, if wheel 28 turns easily the resilient coupling between the input and output members provided by springs 98 and 100 may transmit the entire driving force and permit no relative motion between those two members. If, however, wheel 28 encounters any considerable resistance to movement, either spring 98 or 100 will be overcome and the input member will move relative to the output member, thus causing pressure increase in one of the motor ports 66 or 68, as heretofore described, to produce a hydraulic steering force at motor 24. This pressure increase is utilized in chamber 138 to produce a reaction force tending to recenter the valve thus providing "feel" as previously described.

In case of a power failure in the hydraulic system, safety of the vehicle and its passengers is insured by the provision for direct mechanical steering resulting from the abutment of sleeve 84 against the shoulder 86 or 88 which limits relative movement between the input and output members.

The relative movement required between the valve spool 52 and the body 40 to produce a hydraulic steering force is very slight. It consequently becomes important that the valve spool 52 be biased to a center position, relative to the motor ports 66 and 68, which is quite critically located. If, after assembly and installation, the valve 16 is not properly centered, a rapid accurate one operation adjustment is possible by merely shifting the adjustable stop 124 in the end cap 40.

There has thus been provided a low cost control valve providing follow-up action and "feel" and having coincident spring and hydraulic centered positions which are conjointly adjustable by a single simple adjustment.

While the form of embodiment of the invention as herein disclosed constitutes a preferred form, it is to be understood that other forms might be adopted, all coming within the scope of the claims which follow.

What is claimed is as follows:

1. In a control valve having a relatively movable body and spool, a device for resiliently centering said body and spool comprising: a pair of spaced apart abutments on said spool; an axially floatable piston encircling said spool between said abutments; first resilient means to bias said piston axially against said body; second resilient means acting between said piston and one of said abutments to bias the other said abutment against the piston; means forming a pressure chamber between said piston and said one abutment; and means for supplying pressure fluid to said pressure chamber.

2. In a control valve having a relatively movable body and spool, a device for resiliently centering said body and spool comprising: a pair of spaced apart abutments on said spool; an axially floatable piston encircling said spool between said abutments; first resilient means to bias said piston axially against said body; second resilient means, nested inside said first resilient means, acting between said piston and one of said abutments to bias the other said abutment against the piston; means forming a pressure chamber between said piston and said one abutment; and means for supplying pressure fluid to said pressure chamber.

3. In a control valve having a relatively movable body and spool, a device for resiliently centering said body and spool comprising: a pair of spaced apart abutments on said spool; an axially floatable piston encircling said spool between said abutments; an axially adjustable stop on said body; first resilient means to bias said piston axially against said stop; second resilient means acting between said piston and one of said abutments to bias the other of said abutments against the piston; means forming a pressure chamber between said piston and said one abutment; and means for supplying pressure fluid to said pressure chamber.

4. In a control valve having a relatively movable body and spool, a device for resiliently centering said body and spool comprising: a pair of spaced apart abutments on said spool; an axially floatable piston encircling said spool between said abutments; first resilient means to bias said piston axially against said body; second resilient means acting between said piston and one of said abutments to bias the other of said abutments against the piston, said second resilient means having substantially the same assembled load and rate as said first resilient means; means forming a pressure chamber between said piston and said one abutment; and means for supplying pressure fluid to said pressure chamber.

5. In a control valve having a relatively movable body and spool, a device for resiliently centering said body and spool comprising: a pair of spaced apart abutments on said spool; an axially floatable piston encircling said spool between said abutments; first resilient means to bias said piston axially against said body; second resilient means, nested inside said first resilient means, acting between said piston and one of said abutments to bias the other of said abutments against the piston, said second resilient means having substantially the same assembled load and rate as said first resilient means; means forming a pressure chamber between said piston and said one abutment; and means for supplying pressure fluid to said pressure chamber.

6. In a control valve having a relatively movable body and spool, a device for resiliently centering said body and spool comprising: a pair of spaced apart abutments on said spool; an axially floatable piston encircling said spool between said abutments; first resilient means to bias said piston axially against said body; second resilient means acting between said piston and one of said abutments to bias the other of said abutments against the piston; means forming a pressure chamber between said piston and said one abutment, said piston and said one abutment having pressure effective areas exposed to said pressure chamber in the ratio of 2:1; and means for supplying pressure fluid to said pressure chamber.

7. In a control valve having a relatively movable body and spool, a device for resiliently centering said body and spool comprising: a pair of spaced apart abutments on said spool; an axially floatable piston encircling said spool between said abutments; first resilient means to bias said piston axially against said body; second resilient means acting between said piston and one of said abutments to bias the other of said abutments against the piston; said second resilient means having substantially the same assembled load and rate as said first resilient means; means forming a pressure chamber between said piston and between said one abutment, said piston and said one abutment having pressure effective areas exposed in said pressure chamber in the ratio of 2:1; and means for supplying pressure fluid to said pressure chamber.

8. In a servo control system; a steering element and a steered element; a control valve having relatively movable input and output members with a neutral central position, one member being connected to said steering element and the other to said steered element; a double-acting fluid motor connected to exert force on said steered element, said motor being controlled by said control valve; a source of fluid pressure communicating with said fluid motor through said control valve; and means for hydraulically centering said input and output members comprising a pressure chamber, a small pressure effective area on one of said members exposed to said chamber, piston means shiftable relative to both members having a relatively large effective area exposed to said chamber in axial opposition to said small effective area, means forming an abutment on each of said input and output members, resilient mechanical means in said pressure chamber to bias said abutments into contact with said piston, and fluid conduit means establishing fluid communication between said pressure source and said pressure chamber.

9. In a servo control system: a steering element and a steered element; a control valve having relatively movable input and output members with a neutral central position, one member being connected to said steering element and the other to said steered element; a double-acting fluid motor connected to exert force on said steered element, said motor being controlled by said control valve; a source of fluid pressure communicating with said fluid motor through said control valve; and means for hydraulically centering said input and output members comprising a pressure chamber, a small pressure effective area on one of said members exposed to said chamber, piston means shiftable relative to both members having a relatively large effective area exposed to said chamber in axial opposition to said small effective area, means forming an abutment on each of said input and output members, resilient mechanical means comprising a pair of nested springs in said pressure chamber to bias said abutments into contact with said piston, and fluid conduit means establishing fluid communication between said pressure source and said pressure chamber.

10. In a servo control system: a steering element and a steered element; a control valve having relatively movable input and output members with a neutral central position, one member being connected to said steering element and the other to said steered element; a double-acting fluid motor connected to exert force on said steered element, said motor being controlled by said control valve; a source of fluid pressure communicating with said fluid motor through said control valve; and means for hydraulically centering said input and output members comprising a pressure chamber, a small pressure effective area on one of said members exposed to said chamber, piston means shiftable relative to both members having a relatively large effective area exposed to said chamber in axial opposition to said small effective area, means forming an abutment on each of said input and output members, resilient mechanical means comprising a pair of nested springs, having substantially the same rate and assembled load, in said pressure chamber to bias said abutments into contact with said piston, and fluid conduit means establishing fluid communication between said pressure source and said pressure chamber.

11. In a servo control system: a steering element and a steered element; a control valve having relatively movable input and output members with a neutral central position, one member being connected to said steering element and the other to said steered element; a double-acting fluid motor having a pair of opposed effective areas connected to exert force on said steered element, said motor being controlled by said control valve; a source of fluid pressure communicating with said fluid motor through said control valve; and means for hydraulically centering said input and output members comprising a pressure chamber, a small pressure effective area on one of said members exposed to said chamber, piston means shiftable relative to both members having a relatively large effective area exposed to said chamber in axial opposition to said small effective area, said large and small areas being so proportioned that the ratio of their difference to the small area equals the ratio of the one of said pair of effective areas to the other of said pair, means forming an abutment on each of said input and output members, resilient mechanical means in said pressure chamber to bias said abutments into contact with said piston, and fluid conduit means establishing fluid communication between said pressure source and said pressure chamber.

References Cited in the file of this patent

UNITED STATES PATENTS

| Number | Name | Date |
| --- | --- | --- |
| 787,480 | Tanner | Apr. 18, 1905 |
| 2,596,242 | Hill | May 13, 1952 |
| 2,608,263 | Garrison | Aug. 26, 1952 |